United States Patent [19]
Satoh

[11] Patent Number: 5,341,195
[45] Date of Patent: Aug. 23, 1994

[54] ELECTROPHOTOGRAPHIC PRINTER USING ELECTROLUMINESCENT IMAGING HEAD

[75] Inventor: Yoshihide Satoh, Kanagawa, Japan

[73] Assignee: Fuji Xerox Co., Ltd., Tokyo, Japan

[21] Appl. No.: 933,078

[22] Filed: Aug. 21, 1992

[30] Foreign Application Priority Data

Aug. 23, 1991 [JP] Japan .................. 3-235588

[51] Int. Cl.$^5$ ............................ G03G 15/04
[52] U.S. Cl. ................... 355/237; 313/500; 362/84
[58] Field of Search .............. 355/228, 229, 237, 70, 355/218; 362/84, 249, 252, 800; 315/161, 165, 174; 313/500, 503, 509

[56] References Cited

U.S. PATENT DOCUMENTS

| | | | |
|---|---|---|---|
| 3,254,266 | 1/1961 | Fleming-Williams | 315/161 |
| 3,466,501 | 9/1969 | Young | 315/161 |
| 4,553,148 | 11/1985 | Behrens et al. | 313/500 X |
| 4,645,330 | 2/1987 | Kohyama | 355/229 |
| 4,814,667 | 3/1989 | Tanaka | 362/252 X |
| 4,924,144 | 5/1990 | Menn et al. | 313/509 X |
| 4,987,450 | 1/1991 | Yamada et al. | 355/228 |

FOREIGN PATENT DOCUMENTS

| | | | |
|---|---|---|---|
| 0179176 | 7/1989 | Japan | 355/237 |
| 0172770 | 7/1990 | Japan | . |
| 0184466 | 7/1990 | Japan | . |
| 0043761 | 2/1991 | Japan | 355/237 |
| 62-92868 | 4/1992 | Japan | . |

OTHER PUBLICATIONS

D. Leksell et al., "The Construction and Characterization of a 400-dpi Thin-Film Electroluminescence Edge Emitter", Proceeding of the SID, vol. 29/2, pp.147-150, (1988).

Z. K. Kun et al., "Tfel Edge Emitter Array For Optical Image Bar Applications", Preceedings of the SID, vol. 28/1, pp.81-85, (1987).

*Primary Examiner*—A. T. Grimley
*Assistant Examiner*—Robert Beatty
*Attorney, Agent, or Firm*—Finnegan, Henderson Farabow, Garrett & Dunner

[57] ABSTRACT

An electrophotographic printer using an electroluminescent imaging head having surface emission light emitting elements arranged in an array in the fast scan direction, in which the elements are divided into a plurality of elements in the slow scan direction, and in which the elements in the trailing position have a greater dimension in the slow scan direction than the elements in the leading position.

1 Claim, 10 Drawing Sheets

ELECTROPHOTOGRAPHIC PRINTER USING ELECTROLUMINESCENT IMAGING HEAD

FIELD OF THE INVENTION

This invention relates to an electrophotographic printer, especially one capable of high image quality printing, an electroluminescent imaging head used in the exposure system and a driving system for it.

BACKGROUND OF THE INVENTION

In a conventional electrophotographic printer, as shown in the external view of FIG. 10, a print image is obtained by converting an electrical signal into a light signal, using the light signal to form an electrostatic latent image on a photoconductive member which has previously been charged by a corona discharge, developing this image, and transferring it to an output medium. For example, there are electrophotographic printers having an electroluminescent imaging head (electroluminescent printer head) 52 and a photosensitive drum 51.

The exposure system of such a conventional electrophotographic printer uses for example a thin-film electroluminescent array which is small, has stable luminance and is capable of quick response.

FIG. 11 shows a transverse cross-section of an electroluminescent imaging head, comprising an array of electroluminescent elements 71 and a rod lens array 72. The array of electroluminescent elements 71 comprises the following electrodes and layers formed on a substrate 81, in this order: a metal electrode 82, an insulating layer 83, a light emitting layer 84, an insulating layer 85 and a transparent electrode 86.

The rod lens array 72 is positioned so that the whole light emitting portion is covered. A photoreceptor 90 and the array of electroluminescent elements 71 are positioned on opposite sides of rod lens array 72 (For example, the above described characteristics are described in Japanese unexamined patent application number Sho 62-92868.) The light emitting portion of each electroluminescent elements, as shown in the plan view of FIG. 12, is separately formed with a dimension L in the slow scan direction and a spacing P in the fast scan direction.

It has been proposed, as the exposure system for an electrophotographic printer, as shown in the external view of FIG. 13 to use an electroluminescent imaging head consisting of an electroluminescent device which uses edge emission of electroluminescent elements 92 formed on a substrate 91. (See "The Construction and Characterization of A 400-dpi Thin-film Electroluminescence Edge Emitter" D. Leksell, et al, Proceedings of the SID, Vol. 29/2, 1988, pp. 147–150)

Next, a conventional method of driving an electroluminescent imaging head is described, referring to FIG. 14 and FIG. 15. FIG. 14 is a circuit block diagram of the conventional electroluminescent imaging head and FIG. 15 is a timing chart of the drive operation.

In the circuit of the electroluminescent imaging head, as shown in FIG. 14, each of the drivers IC1 to ICm is connected to electroluminescent elements CEL, and the other ends of the electroluminescent elements CEL are connected to a common drive signal COM. Each driver IC consists of a shift register 1 which reads a data signal together with a clock signal, latch circuit 2 which latches the data signal under the control of a latch signal and output circuit 3 which controls output under the control of an output enable signal OE by changing the level of the latched data signal.

As illustrated in FIG. 15, the data signal is output under the control of the output enable signal OE from output circuit 3, to form an output signal On, which has different waveforms in the light emitting and non-light emitting states. The common drive signal COM has waveforms synchronized with the light emitting and non-light emitting waveforms of the output signal On. Light is emitted when and only when the potential difference of the output signal On and the common drive signal COM is sufficiently high.

In more detail, the data signal undergoes level conversion in output circuit 3 and the output signal On has a peak value $V_{MOD}$. The common drive signal COM has a waveform with a positive peak value $V_{POS}$ which is equal to the sum of $V_{TEL}$, the light-emitting threshold voltage of the electroluminescent elements, and the voltage $V_{MOD}$; the waveform has a negative peak value $V_{NEG}$, which is equal to $-V_{TEL}$. The potential difference between the output signal On and the common drive signal COM is applied to the electroluminescent elements CEL. Light is emitted when and only when the potential difference between the output signal On and the common drive signal COM is over the threshold. Thus, electroluminescent elements in the electroluminescent imaging head are controlled to emit light or not, as required.

The distribution characteristics of the amount of light applied to the photosensitive drum, which rotates at a constant rate, when writing a single pixel using the electroluminescent imaging head, are, as shown in FIG. 16, trapezoidal, and almost rectangular in the fast scan direction, they are, as shown in FIG. 17, asymmetrical in the slow scan direction, rising to a peak, and then falling more gradually. This asymmetry produces distortion in the formation of pixels, and means that high quality printing in an electrophotographic printer is not possible.

The light distribution in the slow scan direction as shown in FIG. 17 results from the relative movement of the electroluminescent imaging head and the photosensitive drum and the light emission response characteristics of the electroluminescent elements, which have a short rise time but a decay time as long as 1 ms.

SUMMARY OF THE INVENTION

It is an object of the present invention to provide an electroluminescent imaging head, a drive method and an electrophotographic printer for the same free of the defects found in the conventional processes.

Accordingly, it is an object of the present invention to provide an electroluminescent imaging head of high image quality, a drive method and an electrophotographic printer for the same by making the light quantity in the slow scan direction in each pixel as uniform as possible.

One aspect of the present invention relates to an imaging head comprising surface emission elements arranged in an array in the fast scan direction, in which the elements are also divided into a plurality of elements in the slow scan direction, and the elements in the trailing position have a greater dimension in the slow scan direction than the elements in the leading position.

Another aspect of the present invention relates to such an imaging head fabricated by combining a plurality of conventional single imaging heads, each forming an array of light emitting elements in the fast scan direction.

Another aspect of the present invention relates to such an imaging head fabricated by combining a plurality of conventional single imaging heads, each forming an array of light emitting elements in the fast scan direction, with spacing members interposed therebetween.

A further aspect of the present invention relates to a drive method for an electroluminescent imaging head in which the elements in the trailing position have a longer drive time than the elements in the leading position.

A further aspect of the present invention relates to a drive method for an electroluminescent imaging head in which the elements in the leading position have a higher drive signal frequency than the elements in the trailing position.

A yet further aspect of the present invention relates to an electrophotographic printer employing the electroluminescent imaging head of the present invention.

BRIEF DESCRIPTION OF THE DRAWINGS

The manner by which the above objects and other objects, features and advantages of the present invention are attained will be fully evident from the following detailed description when it is considered in light of the accompanying drawings, wherein.

DETAILED DESCRIPTION OF THE INVENTION

FIRST EMBODIMENT

Figure 1:
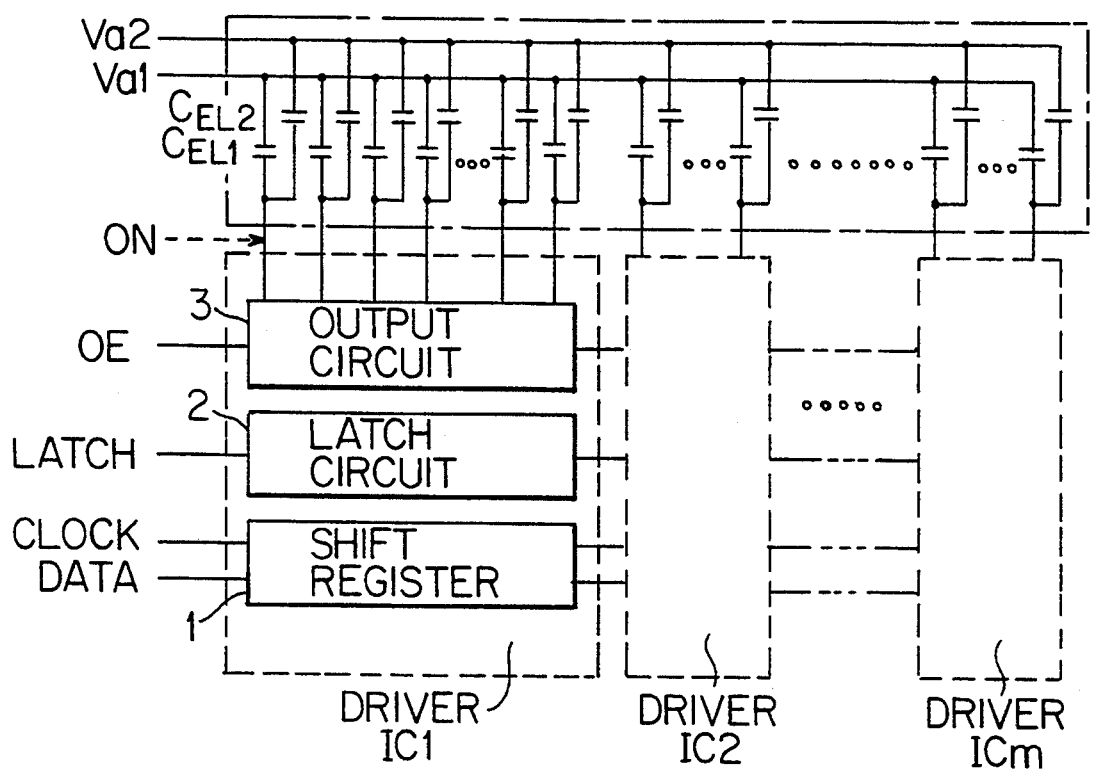
FIG. 1 is a circuit block diagram of one embodiment of a surface emission electroluminescent imaging head according to the present invention.
Figure 10:
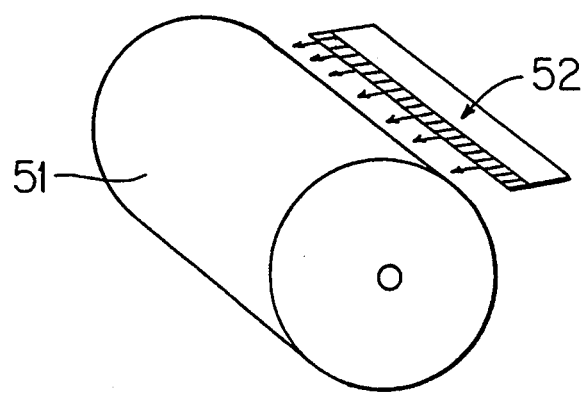
FIG. 10 is an external view of the exposure system of a conventional electrophotographic printer.
Figure 11:
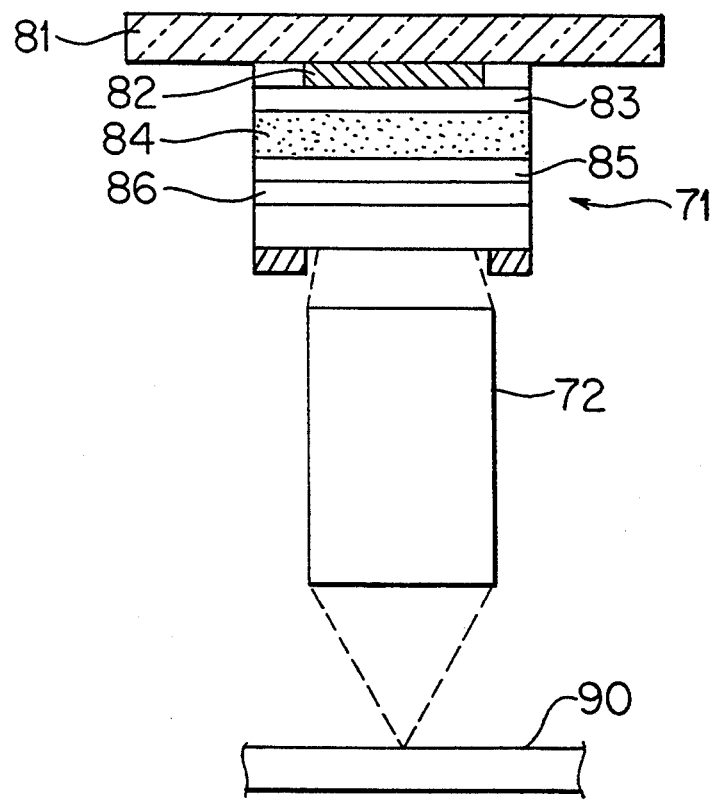
FIG. 11 is a cross-sectional view of a conventional electroluminescent imaging head.
Figure 12:
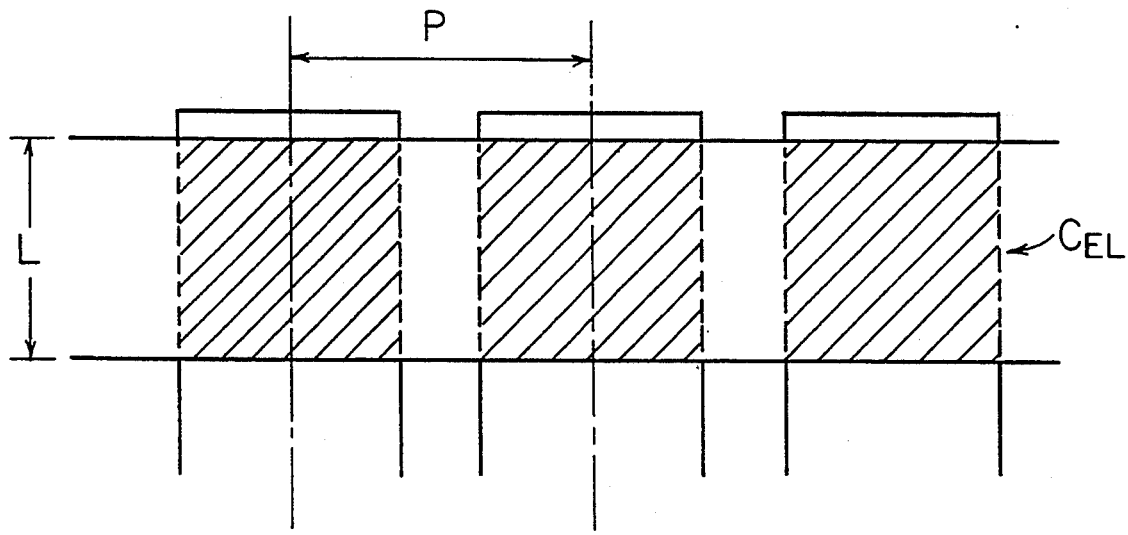
FIG. 12 is a plan view of a conventional electroluminescent imaging head.
Figure 13:
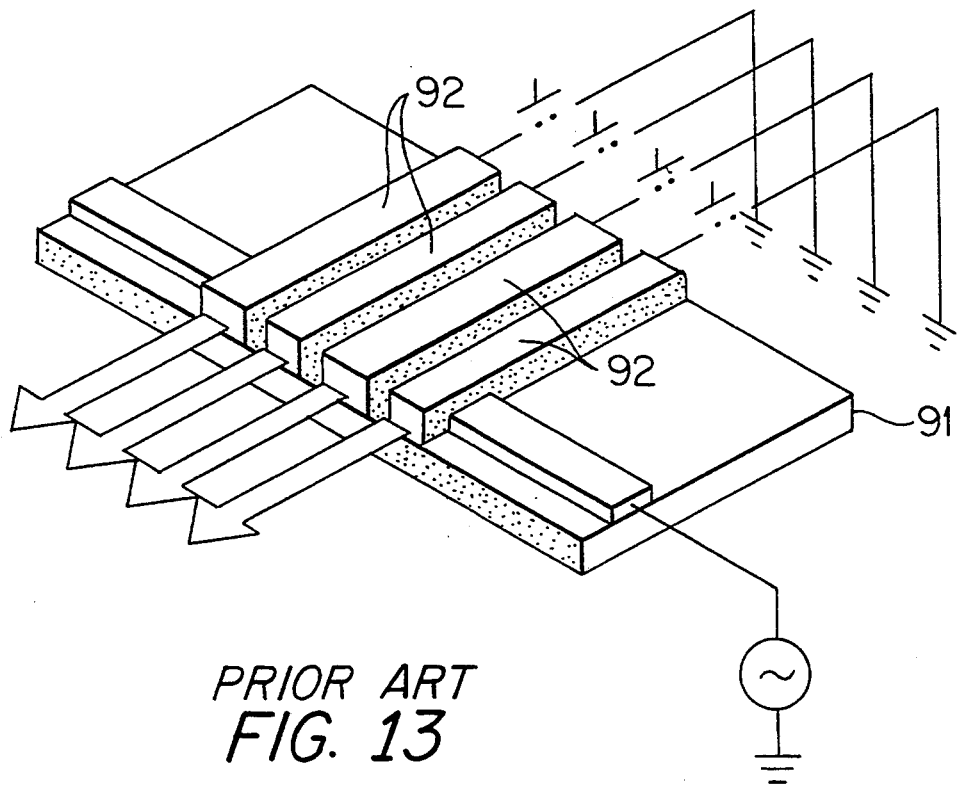
FIG. 13 is an external view of a conventional edge emission electroluminescent imaging head.
Figure 14:
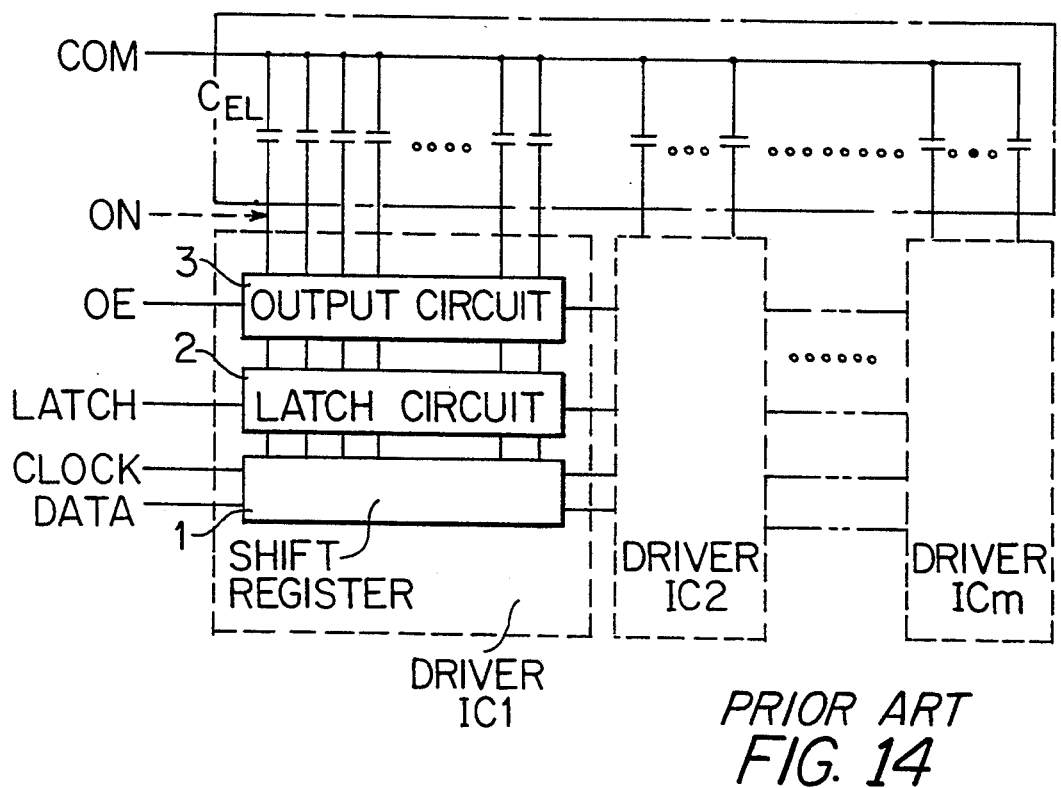
FIG. 14 is a circuit block diagram of a conventional electroluminescent imaging head.
Figure 15:
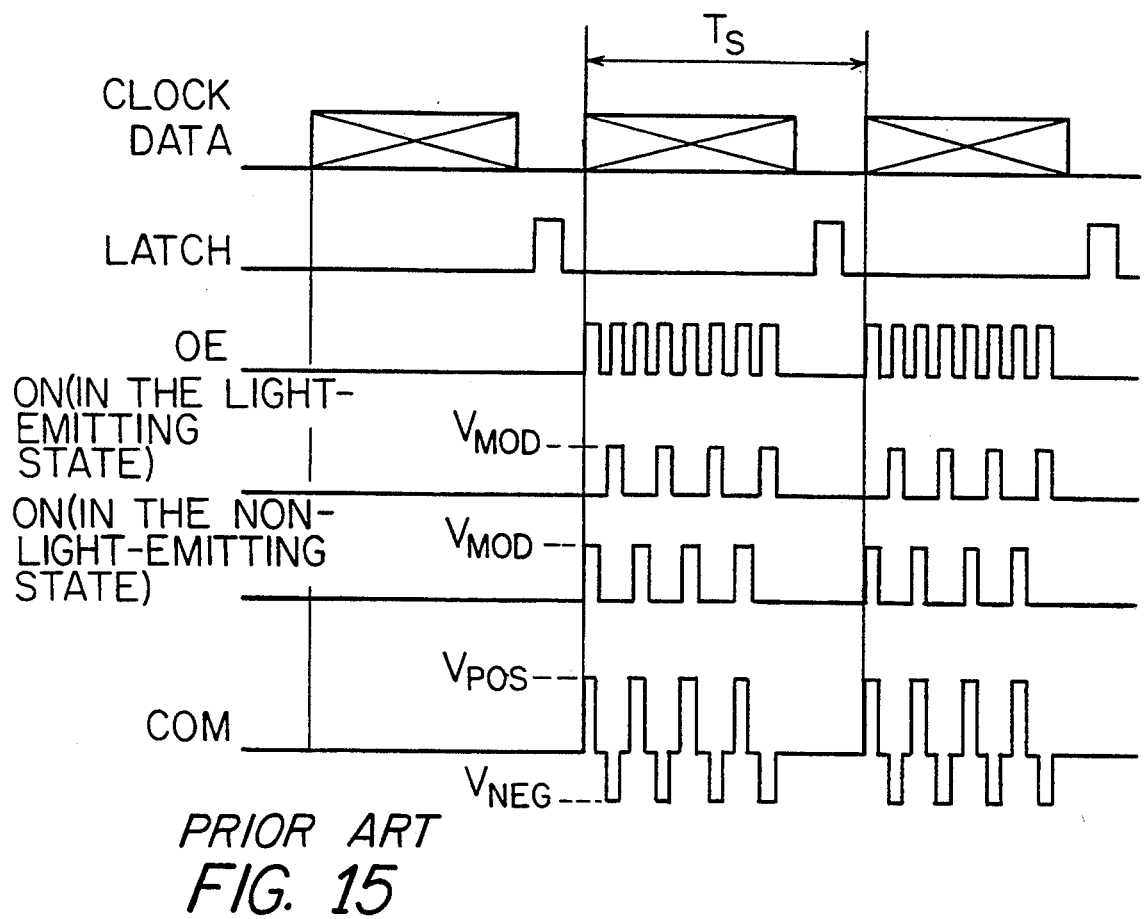
FIG. 15 is a timing chart illustrating the operation of a conventional electroluminescent imaging head.
Figure 16:
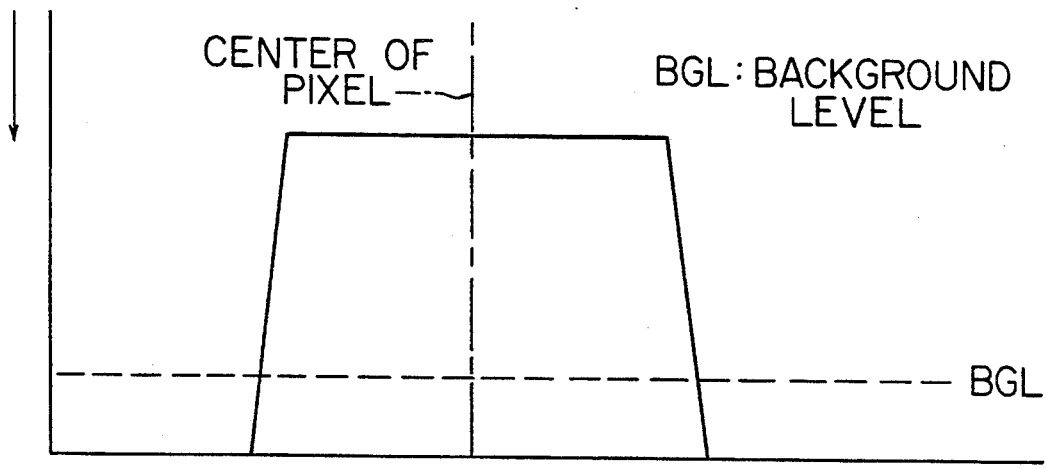
FIG. 16 shows the distribution characteristics in the fast scan direction of the light output to a photoreceptor by a conventional electroluminescent imaging head.
Figure 17:
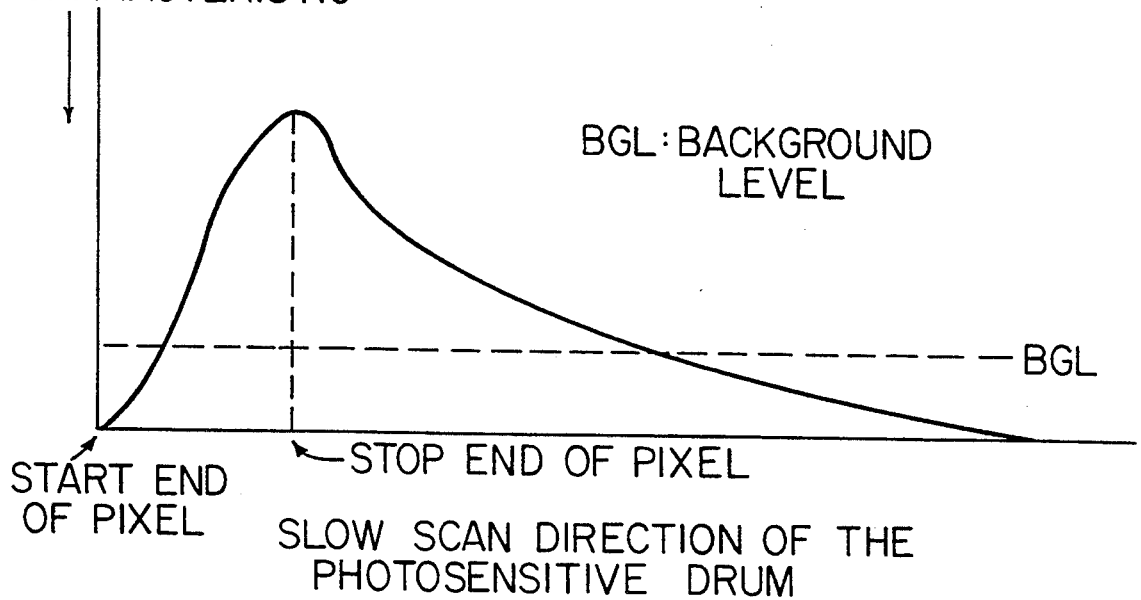
FIG. 17 shows the distribution characteristics in the slow scan direction of the light output to a photoreceptor by a conventional electroluminescent imaging head.

FIG. 1 is a circuit block diagram of a first embodiment of an electroluminescent imaging head, and in it, portions having the same structure as in FIG. 14 are identified by the same reference indications as in FIG. 14. An electrophotographic printer using the electroluminescent imaging head of this embodiment is substantially the same as that illustrated in FIG. 10.

In the circuit of the electroluminescent imaging head of this embodiment, as is shown in FIG. 1, surface emission electroluminescent elements CEL are arranged in two arrays in the fast scan direction on a substrate. The electroluminescent elements in the first array are identified as $C_{EL1}$, and those in the second array as $C_{EL2}$; pairs of corresponding elements in the two arrays are connected together, and these pairs of elements are connected in blocks to a plurality of driver circuits IC1 to ICm. In the discussion of the operation of a single pixel below, the electroluminescent element in the first array is termed the first element, and the electroluminescent element in the second array is termed the second element.

Two different common drive signals are connected to the other electrodes of the electroluminescent elements $C_{EL1}$ and $C_{EL2}$. A first common drive signal $V_{a1}$ is applied to the electroluminescent elements $C_{EL1}$, and a second common drive signal $V_{a2}$ is applied to the electroluminescent elements $C_{EL2}$. This allows the first and second elements to be driven separately.

Figure 18:
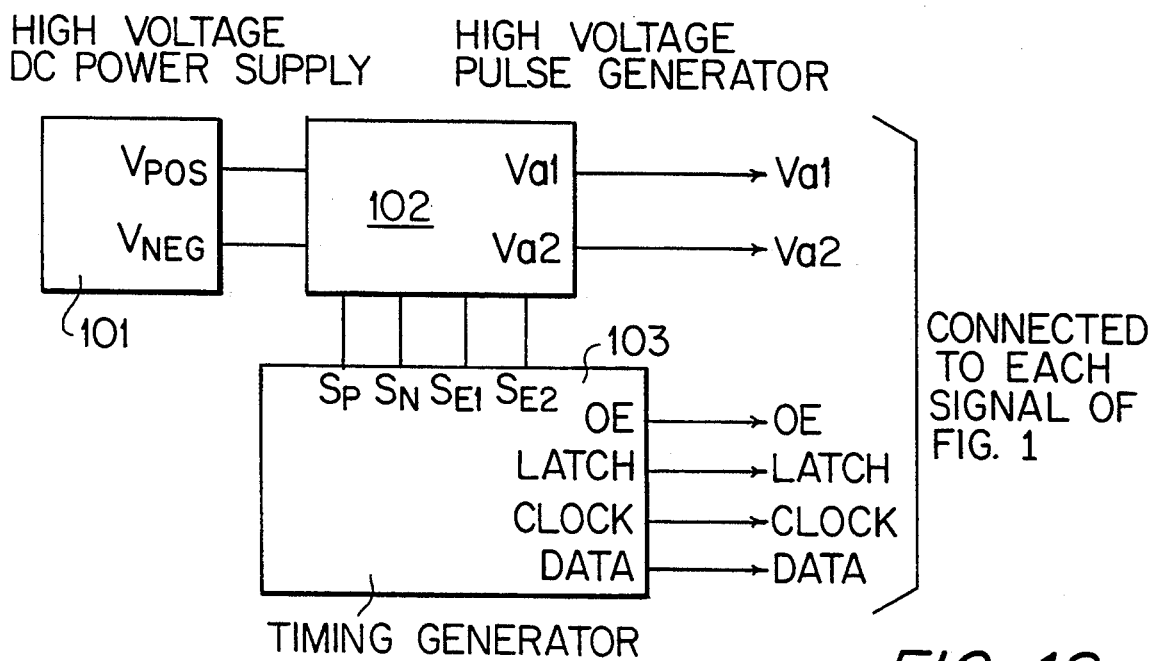
FIG. 18 is a block circuit diagram of a high voltage generating circuit for driving an embodiment of the surface emission electroluminescent imaging head.
Figure 19:
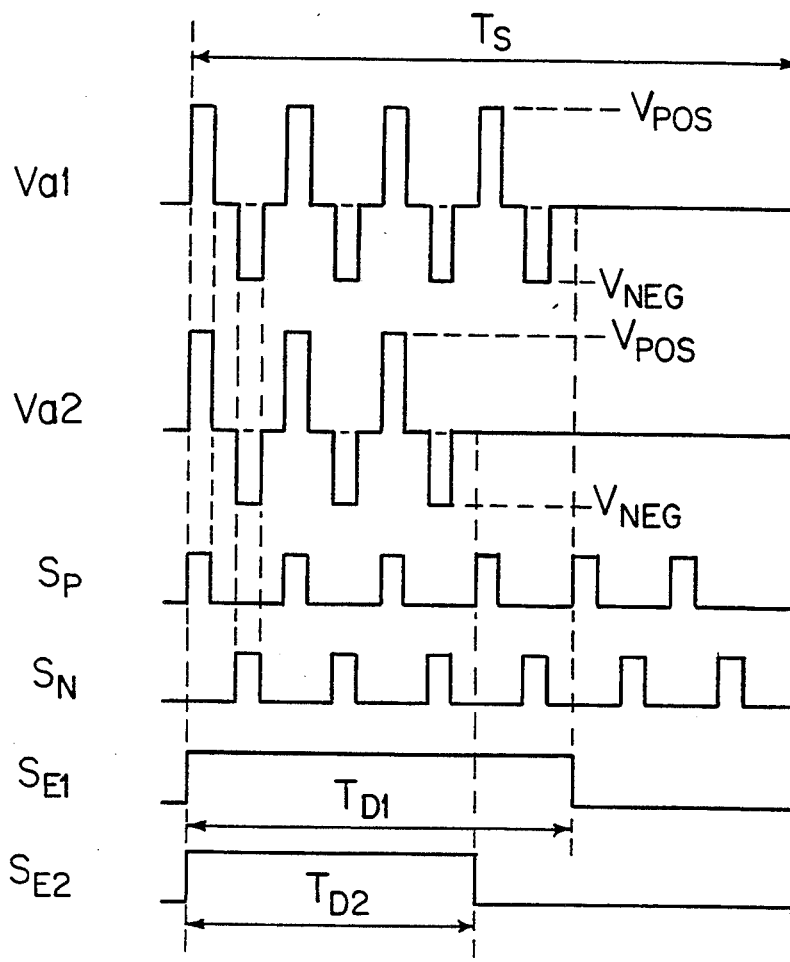
FIG. 19 is a timing chart illustrating the operation of the high voltage generating circuit.

The driver IC consists of a shift register 1 which reads a data signal together with a clock signal, latch circuit 2 which latches the data signal read under the control of a latch signal and output circuit 3 which controls the output signal On which undergoes level conversion under the control of an output enable signal OE so that latched data signal can be synchronized with the first common drive signal $V_{a1}$ and the second common drive signal $V_{a2}$. The output circuits of the first common drive signal $V_{a1}$ and the second common drive signal $V_{a2}$ in FIG. 1 are shown in FIG. 18. The output circuit consists of a high voltage power supply 101, a high voltage pulse generator 102 and a timing generator 103, and in the timing generator 103, the signals of FIG. 1 and the control signals for the common drive signals $V_{a1}$ and $V_{a2}$ ($S_P$, $S_N$, $S_{E1}$ and $S_{E2}$) are generated. $S_P$ controls the positive time of the common drive signals $V_{a1}$ and $V_{a2}$, and $S_N$ controls the negative time of $V_{a1}$ and $V_{a2}$. $S_{E1}$ controls the drive time $T_{D1}$ of the common drive signal $V_{a1}$, and $S_{E2}$ controls the drive time $T_{D2}$ of $V_{a2}$. The timing chart of FIG. 19 illustrates the timing of these signals during the specified time interval Ts.

Figure 2:
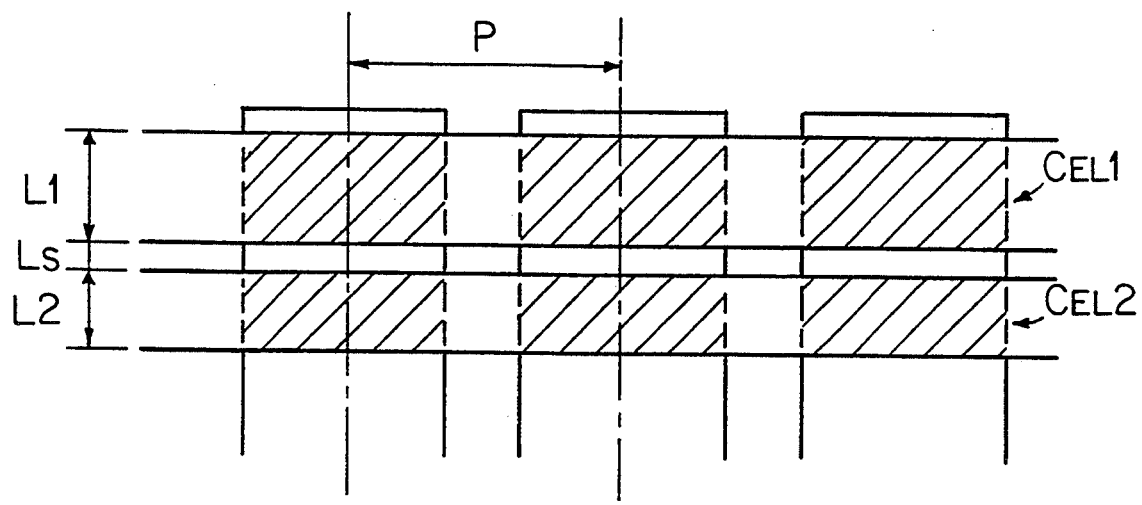
FIG. 2 is a plan view of light emitting elements of a surface emission electroluminescent imaging head of this embodiment.

Next, the physical arrangement of the electroluminescent element portions in the electroluminescent imaging head is described, referring to FIG. 2. FIG. 2 is a plan view of the light emitting element pattern of a surface emission electroluminescent imaging head of this embodiment.

The electroluminescent element portion of the surface emission electroluminescent imaging head of this embodiment consists of surface emission electroluminescent elements. In it, the first electroluminescent elements $C_{EL1}$ and the second electroluminescent elements $C_{EL2}$ are arranged in two arrays in the slow scan direction with a spacing therebetween. Electroluminescent elements CEL consist of the following electrodes and layers formed on a substrate, in this order: separately fabricated metal electrodes, an insulating layer, a light emitting layer of zinc sulfide or the like, another insulating layer and a common transparent electrode. The dimension in the slow scan direction of the first electroluminescent elements $C_{EL1}$ is L1, that of the second electroluminescent elements $C_{EL2}$ is L2, and the spacing between them is LS. L2 is shorter than L1 to reduce the light emitting quantity of the second element.

Figure 3:
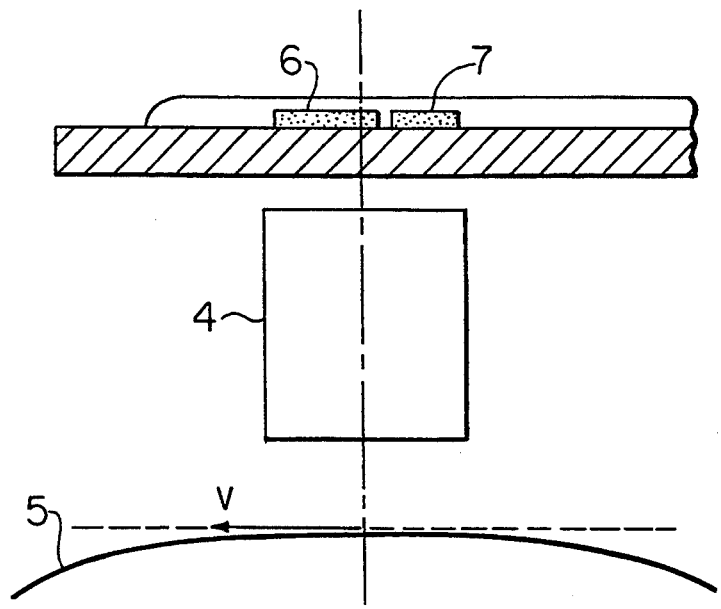
FIG. 3 is a schematic cross-sectional view of a surface emission electroluminescent imaging head of this embodiment.

Rod lens array 4 is made with a specified spacing on the surface emission electroluminescent imaging head made up of the surface emission electroluminescent elements arranged in an array, and the imaging head with rod lens array 4 on it is positioned so that the rod lens array 4 faces the photosensitive drum 5, as is shown in the cross-sectional schematic of FIG. 3. The first element 6 is in the trailing position, and the surface speed of the rotating photosensitive drum 5 is v.

Figure 4:
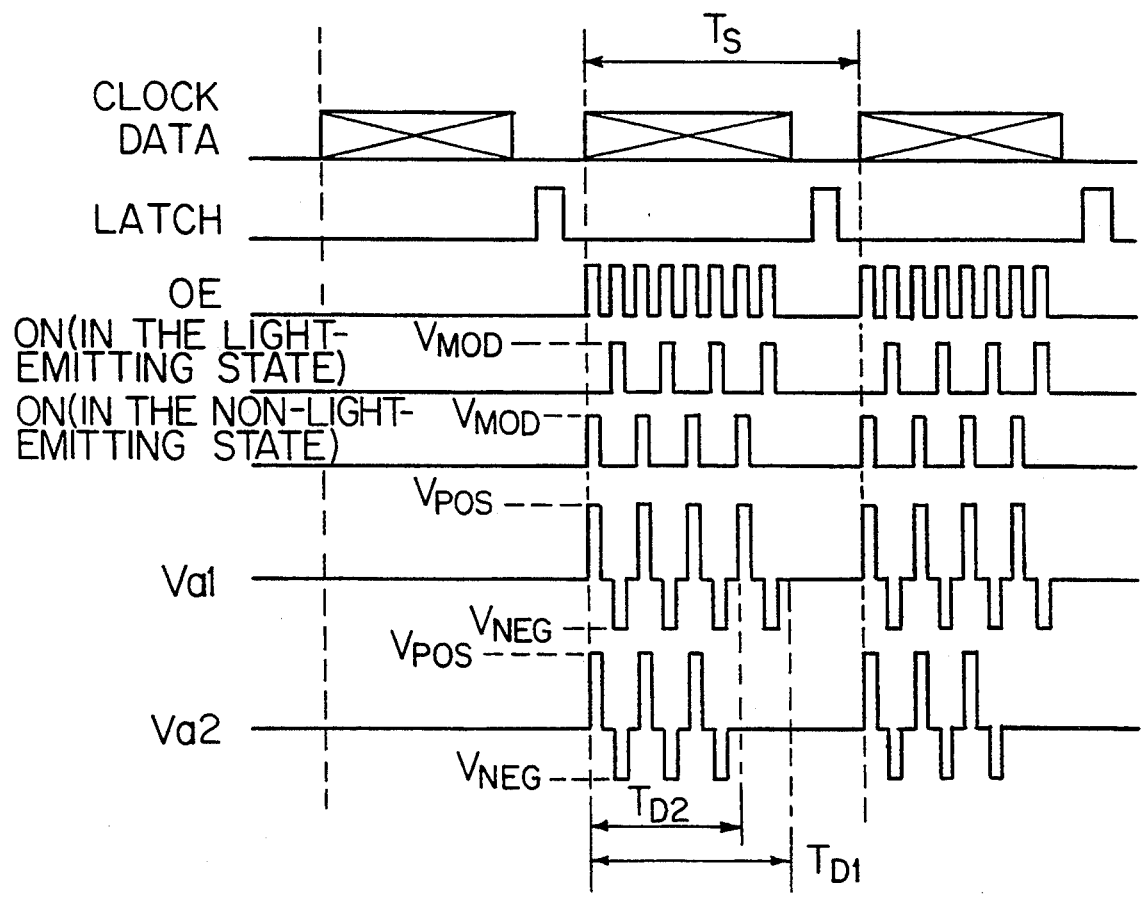
FIG. 4 is a timing chart illustrating the operation of the electroluminescent imaging head of this embodiment.

FIG. 4 is a timing chart illustrating the operation of the electroluminescent imaging head of this embodiment. The data signal supplied to a shift register 1 is read together with the clock signal, latched by the latch circuit 2, and then output under the control of the output enable signal OE from output circuit 3, to form an output signal On, which has different waveforms in the light emitting and non-light emitting states. The first and second common drive signals $V_{a1}$ and $V_{a2}$ respectively for the electroluminescent elements have waveforms synchronized with the light emitting and non-light emitting waveforms of the output signal On. Light is emitted when and only when the potential difference of the output signal On and the common drive signal is sufficiently high.

In more detail, the data signal undergoes level conversion in output circuit 3 and the output signal On has a peak value $V_{MOD}$. The first and second common drive signals $V_{a1}$ and $V_{a2}$ respectively has a waveform with a positive peak value $V_{POS}$ which is equal to the sum of $V_{TEL}$, the light-emitting threshold voltage of the electroluminescent elements, and the voltage $V_{MOD}$; the waveform has a negative peak value $V_{NEG}$, which is equal to $-V_{TEL}$. Light is emitted when and only when the potential difference between the output signal On and the common drive signal is over the threshold. Thus, electroluminescent elements in the electroluminescent imaging head are controlled to emit light or not, as required.

The drive time $T_{D1}$ of the first common drive signal $V_{a1}$ is set to be the basic drive time, and $V_{a1}$ and $V_{a2}$ are controlled so that the drive time $T_{D2}$ of the second common drive signal $V_{a2}$ is shorter than $T_{D1}$, as shown in FIG. 4. Thus, the light emitting time of the second element is shortened and the quantity of light emitted by the second element is reduced because of its small light emitting area and its short drive time.

Figure 5:
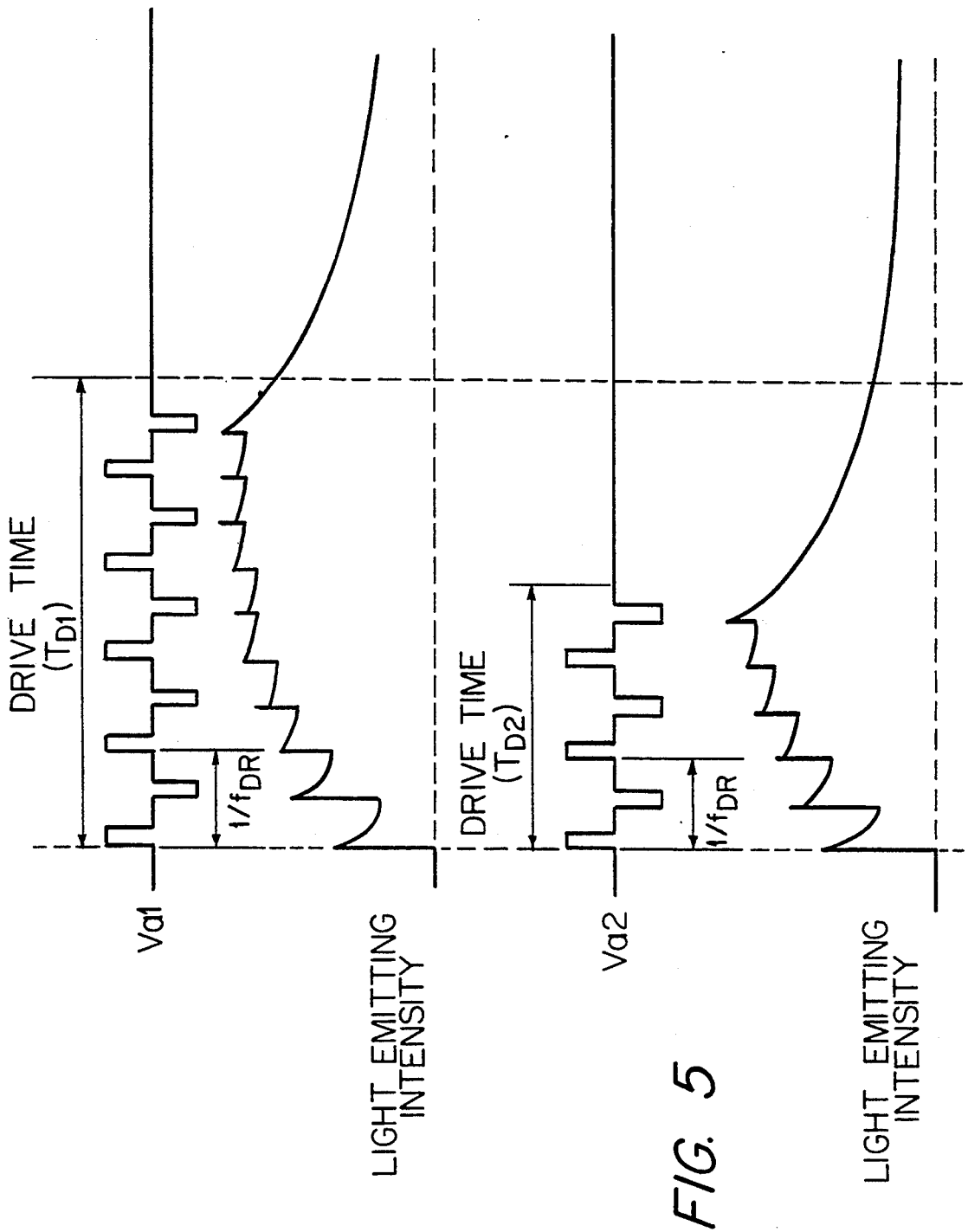
FIG. 5 shows the response characteristics of light emitting intensity of first and second elements when driven independently.

The response characteristics of the light emitting intensity for common drive signals $V_{a1}$ and $V_{a2}$ are shown in FIG. 5. In it, the change of light emitting intensity for the common drive signal $V_{a1}$ during the drive time $T_{D1}$ and that for the common drive signal $V_{a2}$ during the drive time $T_{D2}$ are shown. Here fDR is the drive frequency. As shown in FIG. 5, the light emitting intensity in both cases rises quickly at first, and then, when driven by $V_{a2}$ begins to decline after the relatively short drive time while when driven by $V_{a1}$ it continues to rise longer and then begins to decline.

Figure 6:
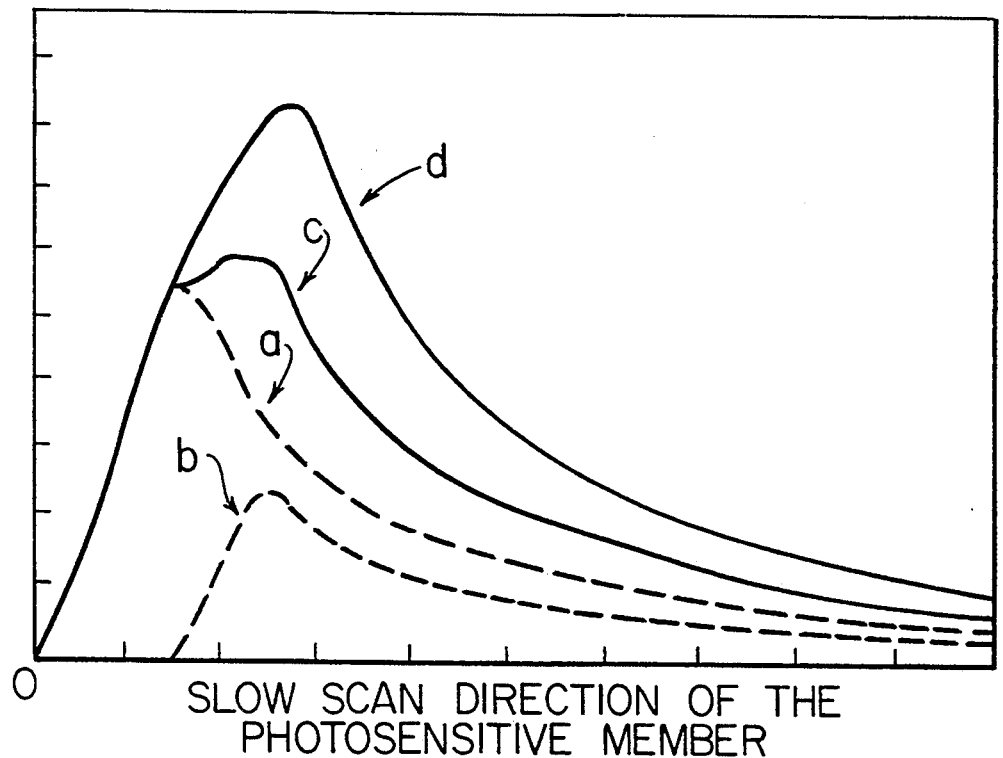
FIG. 6 shows the output light distribution characteristics of the surface emission electroluminescent imaging head.

The distribution characteristics of the amount of light applied to the photosensitive drum in the slow scan direction when writing a single pixel using the electroluminescent imaging head with the light emitting intensity characteristic of FIG. 5 and at a relative speed of v are shown in FIG. 6. FIG. 6 shows the light distribution characteristic of the surface emission electroluminescent imaging head, and in it, the y-axis represents light quantity and the x-axis represents the slow scan direction of a pixel on the photosensitive member.

In FIG. 6, curve a shows the light distribution characteristic of the first element, curve b shows that of the second element and curve c shows the combined light distribution characteristic of the first and second elements. Curve d shows the light distribution characteristic, in the conventional case.

As shown in FIG. 6, the distribution characteristics of the amount of light applied to the photosensitive drum in the slow scan direction when writing a single pixel, has a peak in a conventional embodiment as shown by curve d, and that of the surface emission electroluminescent imaging head with first and the second elements arranged in two arrays as in this embodiment is the combined value from the two elements. Thus, curve c has no peak and is nearer to trapezoidal than the other curves.

With the surface emission electroluminescent imaging head of this embodiment, the combined light distribution characteristics of the first and the second elements are nearer to trapezoidal in the slow scan direction of a pixel of a photosensitive member, by arranging the first and the second elements in two arrays, making the area of the second element smaller than that of the first element, shortening the light emitting time of the second element and by effectively retarding the light emitting timing of the second, leading element, by an amount corresponding to the surface speed v of the rotating photosensitive drum. Therefore, the light quantity in the slow scan direction in a pixel is uniformalized and matches that in the fast scan direction. The surface emission electroluminescent imaging head of this embodiment reduces the distortion of printing in the slow scan direction in a pixel and produces high quality printing.

SECOND EMBODIMENT

Figure 7:
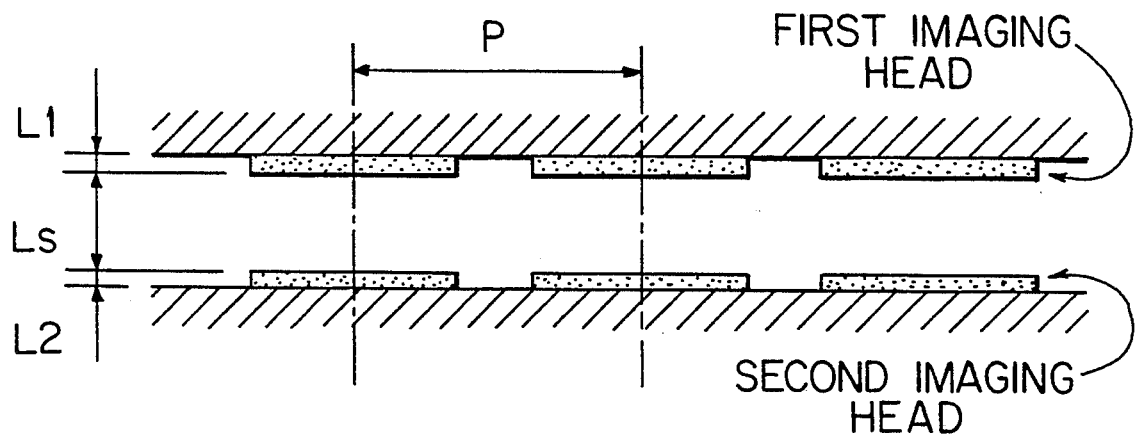
FIG. 7 is a cross-sectional view showing the configuration of light emitting elements of another embodiment of electroluminescent imaging head using edge emission.
Figure 8:
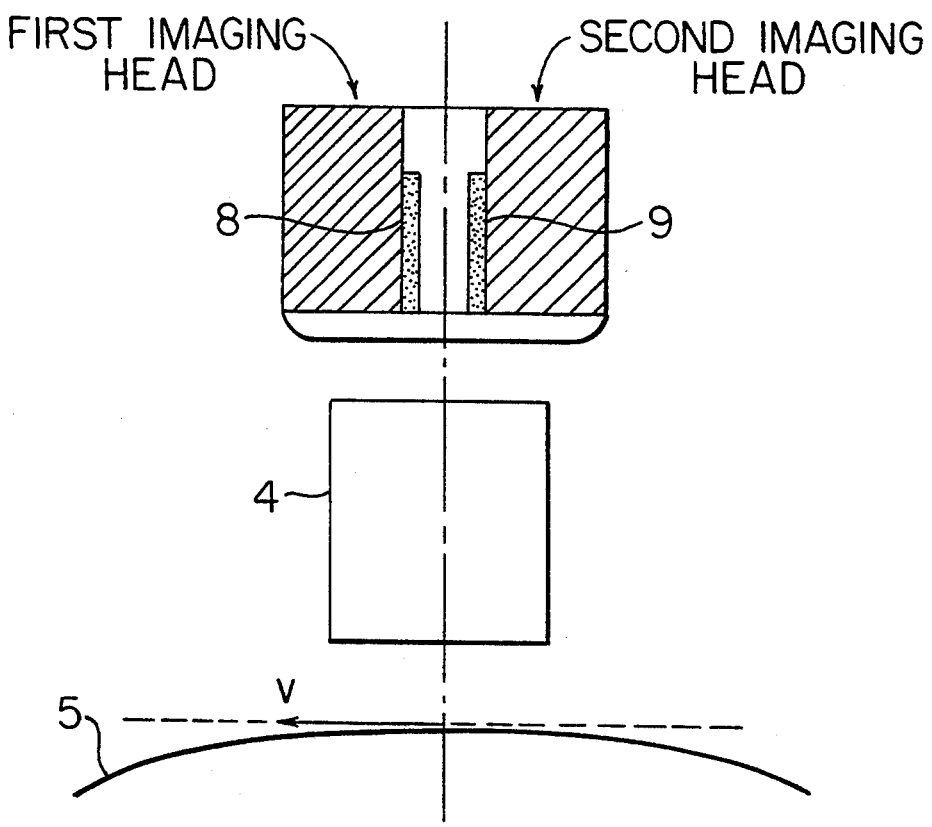
FIG. 8 is a schematic cross-sectional view of the edge emission electroluminescent imaging head.

In the edge emission electroluminescent imaging head of this embodiment, first and second imaging heads are combined with a spacing LS with or without a spacing member interposed therein in the slow scan direction so that the light emitting elements of the first imaging head and the second imaging head are aligned with in the same spacing in the fast scan direction, as shown in the cross-sectional view of the light emitting portion in FIG. 7. These first and second imaging heads are combined so that first imaging head 8 is in the trailing position, as shown in the cross-sectional schematic of FIG. 8. Each of the first and the second imaging heads has the circuit structure shown in FIG. 14 which is equivalent to a conventional one, but the drive time $T_{D2}$ of the second imaging head is shorter than the drive time $T_{D1}$ of the first imaging head. In another words, the drive time of the second common drive signal $V_{a2}$ is shorter than that of the first common drive signal $V_{a1}$.

Increasing the drive frequency of the second common drive signal $V_{a2}$ speeds up the rise to peak value of the light emission characteristics of the second imaging head. The distribution characteristic in the slow scan direction of the light output to the photosensitive drum at a relative movement speed of v, with the two imaging heads combined without a spacer, is as shown in FIG. 9.

Figure 9:
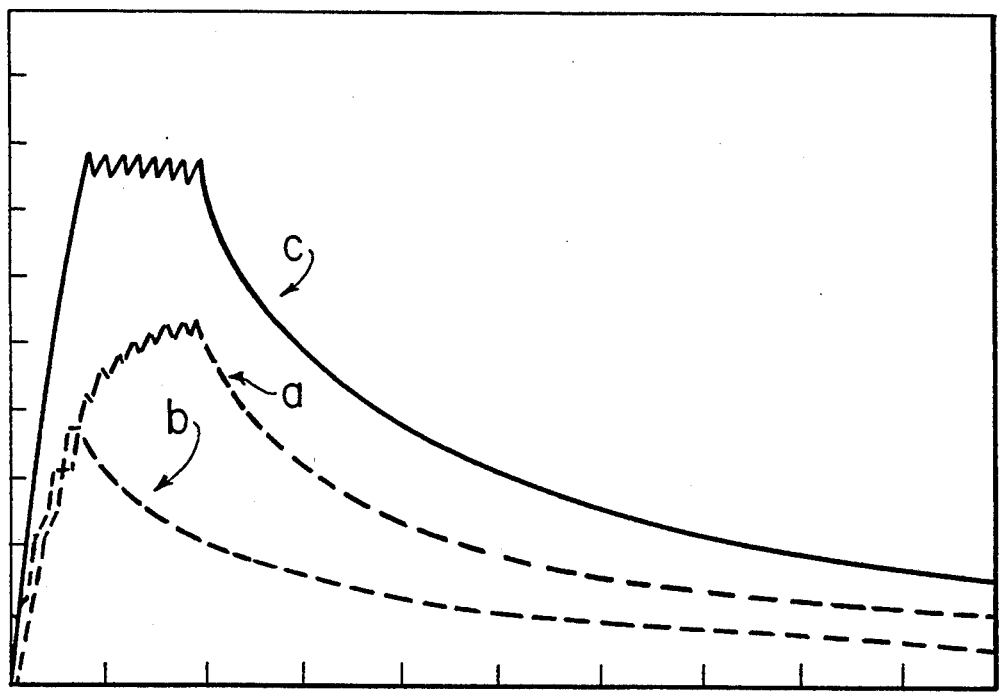
FIG. 9 shows the output light distribution characteristics of an electroluminescent imaging head comprising edge emission electroluminescent elements adjoined with no space.

FIG. 9 shows the distribution characteristics of the amount of light applied to the photosensitive drum in the slow scan direction when writing a single pixel using the edge emission electroluminescent imaging head, and in it, the y-axis represents the light quantity and the x-axis represents the slow scan direction of a pixel on the photosensitive member. In FIG. 9, curve a shows the light distribution characteristic of the first element, curve b shows that of the second element, and curve c shows the combined light distribution characteristic of the first and second elements.

Shortening the drive time $T_{D2}$ of the second imaging head and increasing the drive frequency of the second common drive signal $V_{a2}$ speeds up the rise to peak value of the light quantity of the second imaging head, and combining the light distribution of the first and second imaging heads makes the output light distribution characteristics nearer to trapezoidal.

With the edge emission electroluminescent imaging head of the embodiment with the two substrates combined without a spacer, light distribution in the slow scan direction in a pixel is made nearer to trapezoidal by speeding up the rise to peak value of the light quantity of the second element and combining the light emission of the first and the second elements. Therefore, the light distribution in pixels is uniformalized and the distortion in pixel formation is decreased, and thus the printing image quality of an electrophotographic printer using the edge emission electroluminescent imaging head is improved.

When the bars are combined with a spacer in between, the light distribution characteristics are the same with that of the surface emission electroluminescent imaging head shown in FIG. 6. The light distribution characteristics in this case are made nearer to trapezoidal by forming two peaks and making the light distribution in pixels uniform. It is well matched with the light distribution in the fast scan direction, and the distortion in pixel formation is decreased by uniformalizing the light emitting distribution in the slow scan direction in a pixel, and thus the printing image quality of an electrophotographic printer is improved.

What is claimed is:

1. An electrophotographic printer comprising:
    a photosensitive member;
    an imaging head positioned facing the photosensitive member and comprising an array of light emitting elements formed on a substrate, each of whose elements has a first and a second light emitting element formed in a direction perpendicular to the array and whose said first and second light emitting elements have different sizes.

* * * * *